United States Patent [19]

Nagase et al.

[11] Patent Number: 5,015,436

[45] Date of Patent: May 14, 1991

[54] WATER-COOLED DIRECT CYCLE NUCLEAR POWER PLANT

[75] Inventors: Makoto Nagase, Hitachi; Yamoto Asakura, Katsuta; Motoaki Utamura; Shunsuke Uchida, both of Hitachi, all of Japan

[73] Assignee: Hitachi, Ltd., Tokyo, Japan

[21] Appl. No.: 330,316

[22] Filed: Mar. 29, 1989

[30] Foreign Application Priority Data

Mar. 30, 1988 [JP] Japan .................................. 63-74375

[51] Int. Cl.$^5$ .............................................. G21C 9/00
[52] U.S. Cl. ...................................... 376/306; 376/307
[58] Field of Search ................................. 376/306, 307

[56] References Cited

U.S. PATENT DOCUMENTS 4,828,790  5/1989  Honda et al. ........................ 376/306
4,894,202  1/1990  Nagase et al. ...................... 376/306
4,927,598  5/1990  Nishino et al. ..................... 376/306

Primary Examiner—Brooks H. Hunt
Assistant Examiner—N. Bhat
Attorney, Agent, or Firm—Antonelli, Terry, Stout & Kraus

[57] ABSTRACT

A water-cooled direct cycle nuclear plant including a nuclear reactor, a turbine, a condenser, a purifying means and a feed water heater successively arranged as main constitution, further comprises means for measuring iron concentration in cooling water, and means for injection iron into cooling water for controlling iron amount in cooling water at an optimum level. The iron amount to be injected into cooling water is calculated based on the measured iron concentration so as to make the iron accumulation rate on fuel rod to be not less than 0.5 mg/m²/hr.

18 Claims, 8 Drawing Sheets

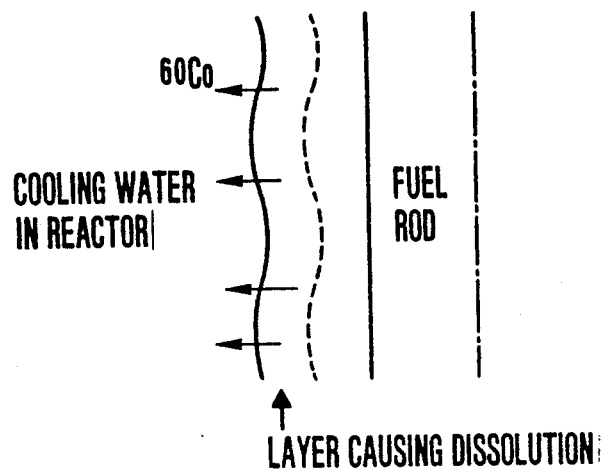
FIG. 2A
(BASIC CONCEPT)
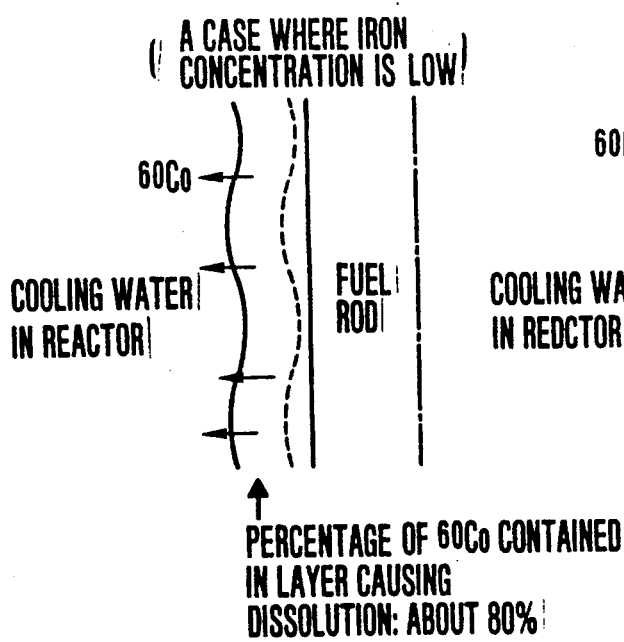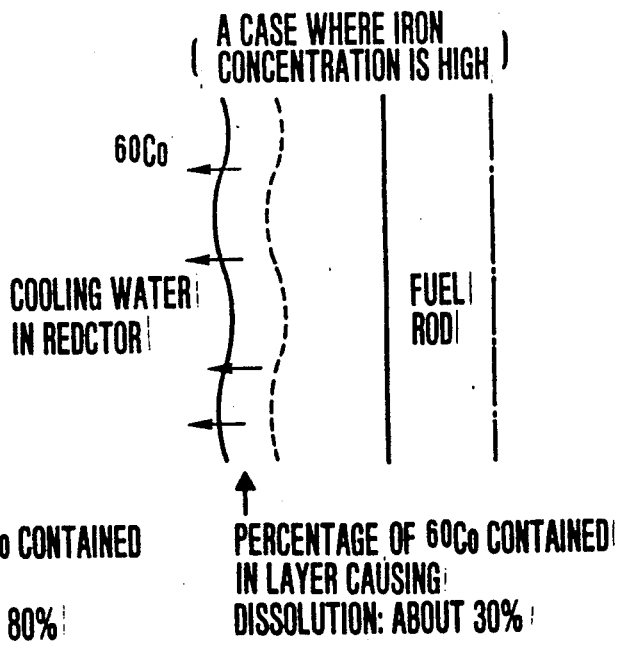

FLOW CHART OF PROCESS FOR CONTROLLING CONCENTRATION OF IRON CORROSION PRODUCT IN FEED WATER

WATER-COOLED DIRECT CYCLE NUCLEAR POWER PLANT

BACKGROUND OF THE INVENTION

The present invention relates to a water-cooled direct cycle nuclear power plant, and to a method for controlling iron concentration in cooling water in order to further decrease radioactive corrosion product concentration in reactor water.

A control method of a prior art for controlling corrosion product concentration in feed water is disclosed in Japanese Patent Laid-Open No. 61-79194, where $^{58}$Co, $^{60}$Co ion concentration in reactor water is controlled at low level by maintaining Fe/Ni concentration ratio in a range of 2 to 10. However, in this control method, a sufficient consideration is not paid to the case where the nickel concentration is further decreased.

In the above prior art, the control is carried out only in dependence on Fe/Ni concentration ratio in feed water. In this control method, $^{60}$Co ion concentration was frequently higher than an expected value, although $^{58}$Co ion concentration may be maintained at low level. Namely, the Fe/Ni concentration ratio is not a sufficient control index.

SUMMARY OF THE INVENTION

The object of the present invention is to provide a water-cooled direct cycle nuclear power plant having a control means which controls iron concentration in feed water at a suitable level in order to maintain $^{60}$Co ion concentration in reactor water at low level even when nickel concentration becomes relatively low in feed water.

The above-mentioned object of the present invention is achieved by a water-cooled direct cycle nuclear power plant, which includes a nuclear reactor, a turbine, a condenser, a purifying means and a feed water heater successively arranged as main constituent elements, and further comprises means for measuring iron concentration in cooling water and means for injecting iron into cooling water for controlling iron amount in cooling water at optimum level. The iron-injecting means includes a processing unit which calculates iron concentration increment to be added on the basis of the data obtained by the above-mentioned iron concentration measuring means in order to supply the iron amount into cooling water for realizing an iron accumulation rate not less than 0.5 mg/m$^2$/hr on fuel rod surface, and a control unit for supplying the calculated amount of iron to feed water.

In the present invention, iron concentration in cooling water is measured, iron accumulation rate on fuel rod surface is calculated based on the measured data, and iron amount to be injected from iron-injecting means is controlled so as to maintain the calculated iron accumulation rate to be not less than 0.5 mg/m$^2$/hr. To maintain Fe/Ni ratio in feed water in a range of 2 to 10 is effective for changing nickel and cobalt adhered to fuel rod surface into chemically stable and almost insoluble ferrite oxide (NiFe$_2$O$_4$, CoFe$_2$O$_4$, etc.), and decreasing the amount of activated $^{58}$Co or $^{60}$Co dissolving into reactor water in comparison with a case where nickel and cobalt are adhered on fuel rod as a monooxide. However, as shown in FIG. 2-A, $^{60}$Co is considered to dissolve into reactor water not from the whole portion of corrosion product adhered on fuel rod surface, but only from a portion of a certain thickness of the product which serves as a dissolvable layer. In consequence, in case iron accumulation layer is thin as shown in FIG. 2-B, the most portion of $^{60}$Co accumulated on fuel rod surface contributes to the dissolution into reactor water, while in case iron accumulation layer is thick as shown in FIG. 2-C, only a part of accumulated $^{60}$Co contributes to the dissolution.

Since the half life of $^{60}$Co is about five years, which is relatively long in comparison with an usual plant operation cycle of one year, the specific activity of Co adhered to fuel rod is regarded as monotonously increasing along time lapse. Actually, the $^{60}$Co concentration increasing rate in reactor water caused by plant operation is usually rather small in comparison with the increase of the specific activity. This is for the reason that, as mentioned above, only a part of $^{60}$Co adhered to fuel rod contributes to the dissolution. In other words, it may be understood that an iron layer newly adhered to fuel rod has a function to shield a dissolution of $^{60}$Co from an oldly adhered layer having a higher specific activity into reactor water. With this view point, a relation between iron accumulation rate on fuel rod and $^{60}$Co concentration increase rate in reactor water is calculated, result of which is shown in FIG. 3, showing a tendency that the latter becomes smaller as the former becomes greater. From this figure, it is found that the $^{60}$Co concentration increase rate in reactor water becomes small in a case where the iron accumulation rate on fuel rod is not less than 0.5 mg/m$^2$/ hr. Therefore, iron concentration can be controlled at an optimum level by using iron accumulation rate as a control index.

However, if iron amount accumulated on fuel rod become unnecessarily great, heat transfer from fuel rod to reactor water is deteriorated with a risk of causing failures of fuel cladding tubes; and $^{54}$Mn and $^{59}$Fe, which are generated by iron activation, increases, causing a increase of total radioactive concentration. Therefore, it is required to limit the amount of iron to be accumulated.

In this text, the nuclear reactor is of a type where water is used as a coolant and boiled on fuel rod surfaces such as seen in a boiling water reactor or advanced thermal reactor. The term of iron concentration means a concentration of all irons existing in cooling water including ionized Fe, not-ionized iron hydroxide, iron oxide etc. regardless of their chemical states. The iron concentration measuring means is a device which can measure the iron amount included in a sampled specimen for atomic absorption or ion chromatograph in a dissolved and ionized state of iron. The control means for controlling iron amount in cooling water at an optimum level is a device comprising a memory and a calculator required for deducing an iron accumulation rate on fuel rod surface from the measured iron concentration, and a control unit constituted by a flow rate control valve or a pump of variable flow rate required for controlling iron-injecting rate according to the calculated results of the calculator. The iron-injecting means is a device comprising an iron generating means by virtue of ionizing or cladding through electrolytic analysis, or a water tank containing water including iron constituent, and a pump for injecting the water including iron constituent into the cooling water.

BRIEF EXPLANATION OF THE DRAWINGS

FIGS. 2A, 2B and 2C are views schematically showing relations between $^{60}Co$ dissolution and iron accumulation;

DESCRIPTION OF THE PREFERRED EMBODIMENT

Embodiment 1

Figure 1:
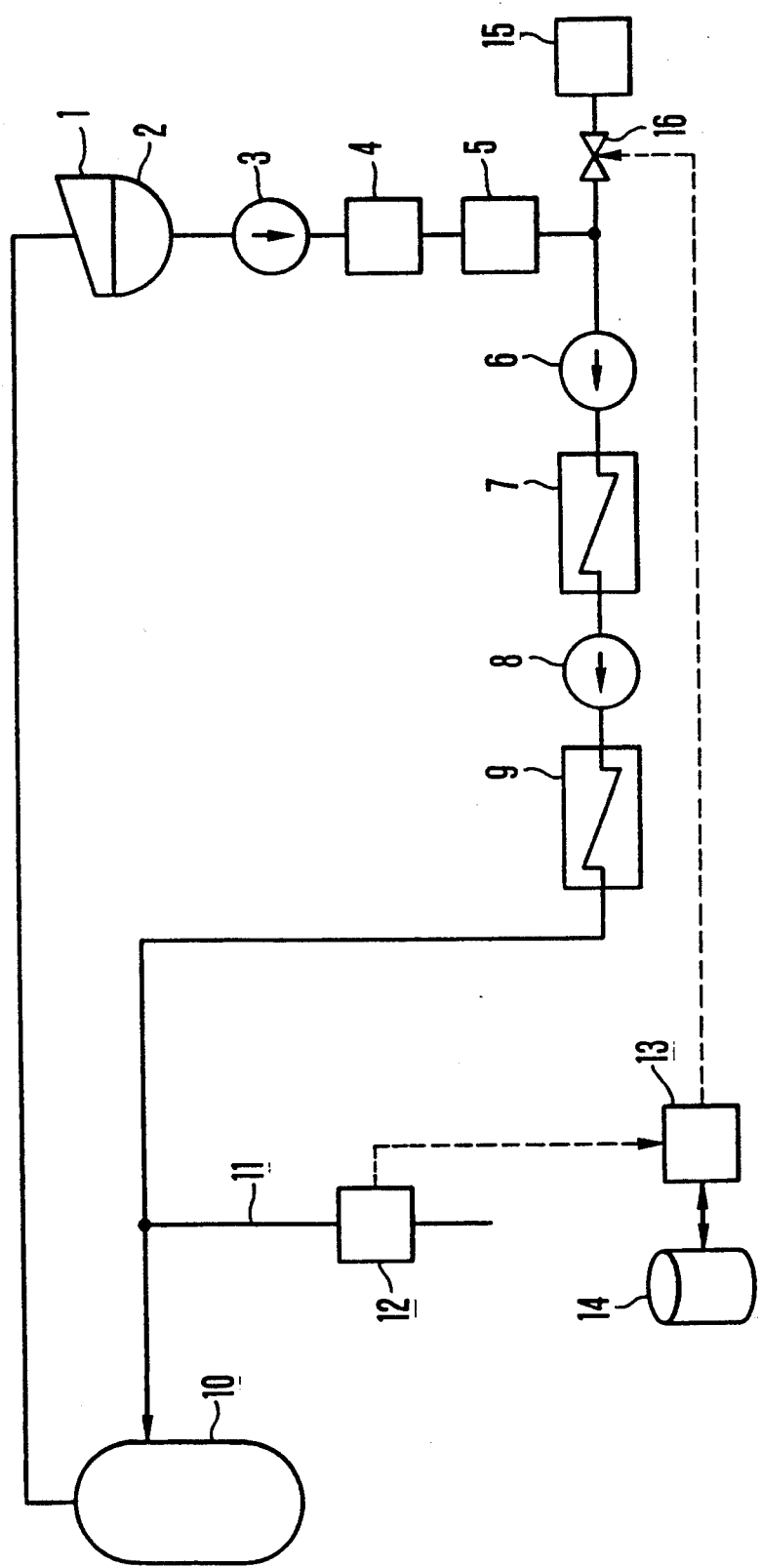
FIG. 1 is a system diagram of a nuclear power plant of a boiling water reactor type according to one embodiment of the present invention.

In FIG. 1, steam generated in a reactor 10 actuates a turbine 1 and is then condensed in a condenser 2; when condensed water including corrosion products is passed from the condenser 2 through condensed water pre-filter 4 and condensed water desalter 5 by means of condensed water pump 3, most portion of the corrosion products are removed. The purified water is flowed through feed water pump 6, low pressure feed water heater 7, pressurizing pump 8 and high pressure feed water heater 9 into nuclear reactor pressure vessel 10. Corrosion products carried into pressure vessel 10 were composed of corrosion product which had not been removed in condensed water desalter 5 and, in addition, Ni or the like which was mainly generated due to corrosion of high pressure feed water heater 9. The amount of the corrosion products carried into pressure vessel was measured by analysing a specimen picked through a sampling line 11 by means of a concentration measuring means 12.

The sampling of specimen and the measuring of iron concentration existing in the specimen were effected in the manner explained below. A specimen holder having a sheet of millipore filter of 0.45 μm in pore size and two or three sheets of positive iron-exchanging papers was attached to a sampling line 11. Then, in order to catch iron clad contained in the reactor-cooling water, the cooling water was made to flow through the specimen holder disposed in the sampling line 11 at a flow rate of about 100 ml so that an accumulation flow amount of the cooling water flowing therethrough was in a range of 100 to 150 litters. The iron clad caught by the millipore filter was dissolved in a heated hydrochloric acid of 200 ml in volume and 6N in concentration and then distilled water was added thereto to provide a constant volume. The positive ion-exchanging paper for catching iron ion was immersed in hydrochloric acid of 15 ml in volume and 2N in concentration for a period of not less than 5 minutes, this treatment being repeated two or three times, and finally an iron ion-containing solution of a constant volume was prepared by use of hydrochloric acid of 2N in concentration. The resultant specimen solution having been thus prepared was measured by use of a usually used atomic absorption spectro photometer to thereby obtain an iron concentration, the specific process of the atomic absorption spectro photometry being prescribed in JIS K 0121.

In the present invention, the measured iron concentration was converted into iron accumulation rate on fuel rod through calculator 13 while referring to plant parameters stored in a data memory 14 by use of the following equation.

$$\alpha = \frac{C \cdot F}{S} \cdot \frac{P}{P_{max}} \quad (1)$$

where,
α: iron accumulation rate on fuel rod (mg/m²/hr)
C: iron concentration in feed water (ppb)
F: nominal feed water flow rate (t/hr)
S: fuel rod surface area (m²)
P: plant output power at measurement time (MW)
$P_{max}$: rated output power (MW)

When iron accumulation rate α is smaller than 0.5, the iron concentration in cooling water should be increased correspondingly to the amount $(0.5 - \alpha)$, namely, iron concentration to be added was calculated by the following equation 2:

$$\delta C = (0.5 - \alpha) \frac{S}{F} \cdot \frac{P_{max}}{P} \quad (2)$$

where,
δC: lower limit of iron concentration in feed water to be added

Figure 8:
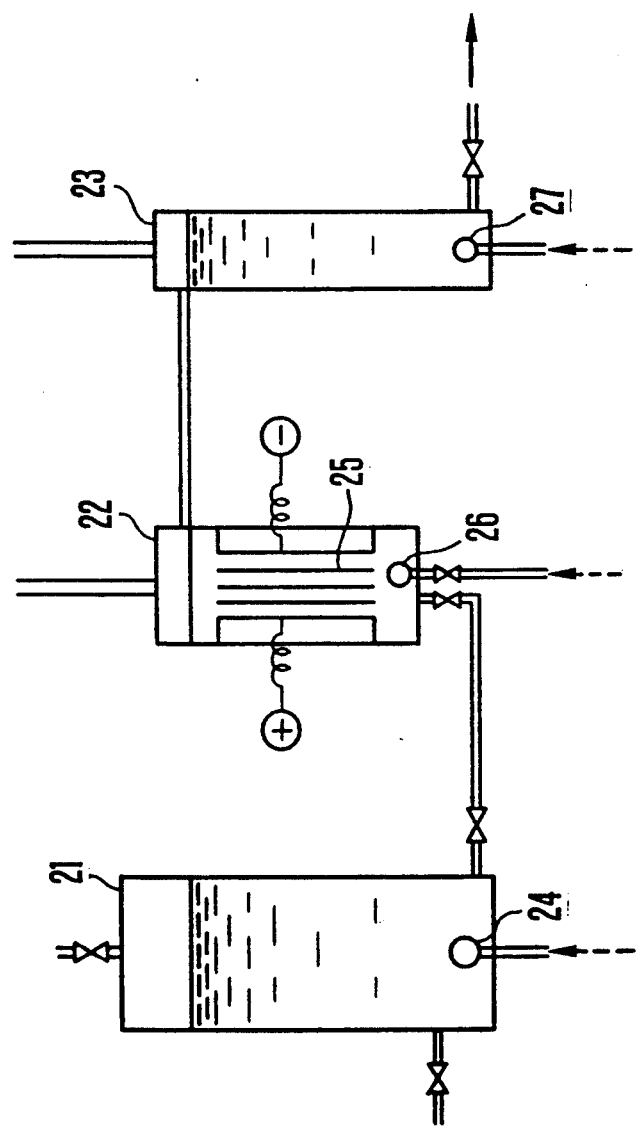
FIG. 8 is a schematic sectional view of a device for generating iron crudes simulating the chemical states in the condensated water by anodic oxidation of iron.

Iron amount to be injected from an iron-injecting means 15 correspondingly to the above lower limit value δC was obtained as δC×F. However, actually, the iron amount to be poured is required to be further added by an iron amount which compensates the iron adhering to structures and tubings of reactor. Since experiences in the past showed that 80–90% of iron carried into reactor adhered to fuel rod, the lower limit of the iron amount to be further added may be determined as 10–20% of (C+δC). A suitable amount of iron was injected from iron pouring means 15 under control of flow rate control valve 16. The ion-injecting device 15 was provided with a device for generating electrolytic iron disclosed in Japanese Utility Model Unexamined Publication No. 63-135200. The construction of the electrolytic iron-generating device used in the embodiment is shown in FIG. 8, which device comprises a water tank 21 operating as a source of water containing carbonic ion, an electrolytic cell 22 provided with an iron sheet electrode 25 operatively connected to the water tank 21 so as to receive the $CO_2$ gas, and a device 23 for discharging cabonic ion contained in iron ion-including water generated in the electrolytic cell 22. By using the electrolytic iron-generating device, water containing iron ion of about 100 ppm was obtained under such conditions that $CO_2$ gas was fed to the water reservoir 21 through a nozzle 24 at a rate of 50 litter/hour to generate the carbonic ion in water, $N_2$ gas being fed to the electrolytic iron-generating device 23 at a rate of 100 litter/hour through a nozzle 26 for agitating water in the vicinity of the iron sheet electrode, $N_2$ gas being fed in the carbonic ion-removing device 23 at a rate of 200 litter/hour through a nozzle 27 so as to remove carbonic ion contained in the iron ion-including water, electrolytic current being 20 A at 100 V, degased pure water being fed to the water reservoir 21 at a rate of 60 litter/hour. By controlling the flow rate of the resultant ion ion-including water through a flow control valve, it was possible to increase ion concentration in feed water by 0.3 to 1.0 ppb in a case of a nuclear power plant of 1100 MWe and 6400 t/h in feed water flow rate.

On the other hand, when iron accumulation rate $\alpha$ obtained from equation (1) is greater than 3, preferably greater than 2 (mg/m$^2$/hr), iron concentration in cooling water should be decreased correspondingly to the value ($\alpha - 2.0$), namely as follows:

$$\delta C' = (\alpha - 2.0) \frac{S}{F} \cdot \frac{P_{max}}{P} \quad (3)$$

where, $\delta C'$: iron concentration to be decreased in feed water (ppb)

The iron accumulation rate on fuel rod can be controlled smaller than 2.0 (mg/m$^2$/hr) by decreasing the iron amount to be poured by an amount ($\delta C' \times F$) corresponding to the above $\delta C'$ by means of flow rate control valve 16, or by stopping the iron injection.

In a case of injecting water containing iron ion of 100 ppm in concentration in a nuclear power plant of 1100 MWe class, amount of change in feed flow rate corresponding to $\delta C' \times F$ becomes 64 $\delta C'$ (l/h) (, that is, $\delta C' \times 6400/100$). By changing the flow rate by this value, the value of $\alpha$ becomes in a preferred range of not more than 2.0. However, in a case of relatively high iron concentration, there occurs such unfavorable phenomenon as radioactivity increases due to the increment of iron concentration in feed water. Thus, after the lapse of operating time of 5000 hours, it is preferred to control the injecting rate of the iron ion-containing water so that the $\alpha$ value may be in a range of 0.5 to 1.0. But, if concentration of iron ion contained in the feed water exceeds a value corresponding to 0.5 regarding the $\alpha$ value even in a case where the injecting rate of the iron ion-containing water fed into the feed water is zero, it is unnecessary to effect the injecting of the iron ion-containing water into the feed water. Since in this case it becomes impossible to effect the control of ion concentration in the feed water, it is preferred to improve the ability of condensate-purification means.

By controlling the iron concentration in feed water between 0.5 and 2.0 (mg/m$^2$/hr) as described above, the increase rate of $^{60}$Co concentration can be maintained at a low level.

Although the output value (P) of the plant at the time of measuring iron concentration is used for calculating iron accumulation rate $\alpha$ in equations (1), (2) and (3), it can be replaced by feed water flow rate at the measuring time, as follows:

$$\alpha = \frac{C \cdot F}{S} \quad (1)'$$

$$\delta C = (0.5 - \alpha) \cdot \frac{S}{F'} \quad (2)'$$

$$\delta C' = (\alpha - 2.0) \cdot \frac{S}{F'} \quad (3)'$$

wherein $F'$ is a feed water flow rate at measuring time (t/hr).

MODIFIED EXAMPLE

For the above-mentioned embodiment, a modification is possible as described below.

In an initial operational stage of first cycle of a new nuclear power plant, the probability of contacting of iron with nickel or with cobalt on fuel rod surface is considered low, because corrosion product is still of a small quantity. Considering this matter, it may be preferable to set the lower limit of iron accumulation rate on fuel rod to be not less than 0.5 until corrosion product is adhered on the whole surface of fuel rod in the initial operational stage of the first cycle. It is effective for maintaining dose rate of primary system at a low level to positively form an iron adhesion layer on fuel rod surface at an early stage of operation, which iron adhesion layer reduces the concentration of radioactive corrosion product in reactor water in a period of time when a rather great quantity of radioactive corrosion product is being adhered to structures or tubings of plant.

EMBODIMENT 2

Figure 4:
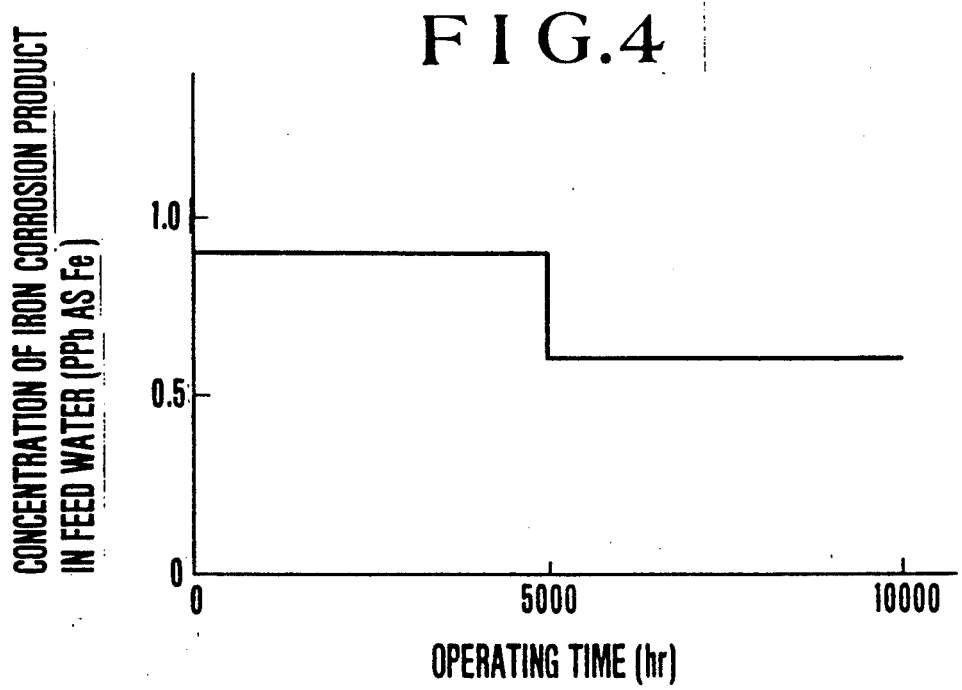
FIG. 4 is a graph showing a relation between iron concentration command value and operation time lapse.

In the nuclear power plant of the second embodiment of the invention in which the accumuration rate of iron accumurated on fuel rods is to be controlled, a relation between a concentration of iron contained in feed water and an accumuration rate of iron on the fuel rod was previously obtained in accordance with parameters inherent in the power plant. Then, as shown in FIG. 4, there was determined a target value for controlling the iron concentration of the feed water with respect to the operating time of the nuclear power plant. In compliance with the target value, an actual iron concentration of the feed water was controlled during the operation of the plant so that the accumulation rate or iron accumulated on the fuel rods was not less than 0.5 mg/m$^2$/hr.

Specific example is explained below with respect to a nuclear power plant of 1100 MWe. The parameters of the plant were a rated heat output ($P_{max}$) of 3300 MWt, a feed water flow rate of 6400 t/h, and a fuel rod surface area of 7000 m$^2$. Under an assumption of the rated output operating, the control target lower values of $\alpha$ was determined to be 0.7 till 5000 hours from the commencement of the operating of the plant and to be 0.5 after the lapse of 5000 hours therefrom. Thus, an iron concentration of the feed water was 0.77 ppb till 5000 hours from the commencement of the operating of the plant by calculating from the formula (1) and was 0.55 ppb after 5000 hours therefrom, as shown in FIG. 4.

Figure 9:
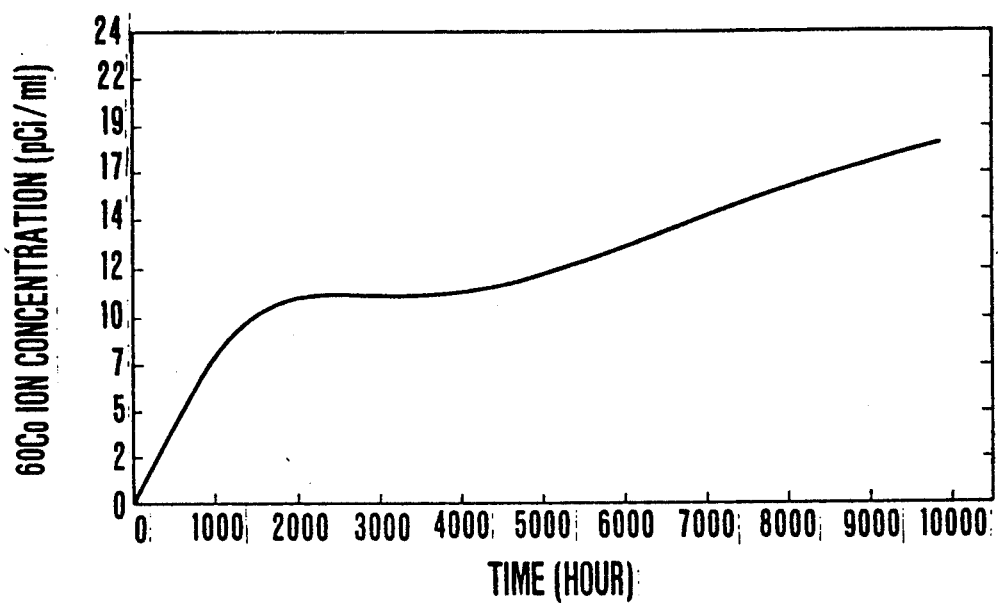
FIG. 9 is a graph showing an interrelation between the operating period of time of the nuclear power plant operating in accordance with the process embodying the invention and change in concentration of $^{60}Co$ existing in reactor water.
Figure 10:
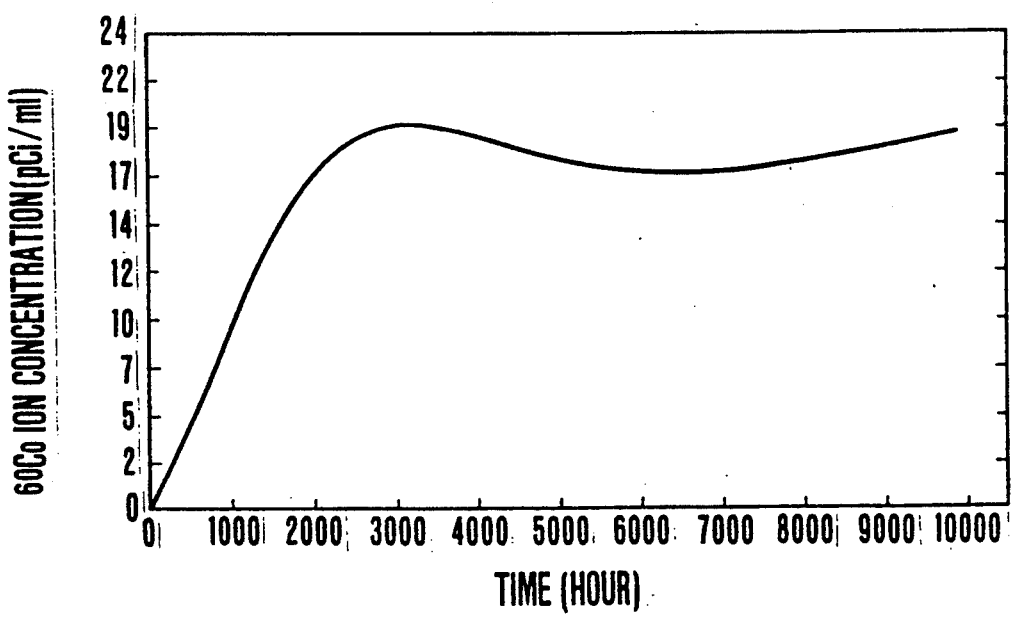
FIG. 10 is a graph showing an interrelation between the operation period of time of the nuclear power plant operating without controlling the iron concentration and the change in concentration of $^{60}Co$ existing in reactor water.

In FIG. 9 there is shown a result of analysis of a simulation with respect to $^{60}$Co ion concentration of feed water in a case of effecting an operating of the plant in accordance with the iron concentration-controlling pattern of FIG. 4. For comparison, in a case where the iron concentration was made to be a constant value of 0.3 ppb during the whole operating period with the result that the iron accumulation rate of the fuel rod (α) was a constant value of 0.27, there was also effected another simulation to thereby obtain an analysis result shown in FIG. 10. In comparing the results shown in FIGS. 9 and 10, it was found that in the second embodiment of the invention the $^{60}$Co concentration of the feed water was reduced by 20% to 40% in comparison with the case of FIG. 10 where no control of iron concentration was effected. Thus, it was deemed that, after the lapse of 10000 hours from the commencement of the operating of the plant shown above, a dose rate of the surface of piping was about 25 mR/h, while the dose rate was about 35 mR/h in the case of FIG. 10 (, that is, the dose rate in the case of FIG. 10 is higher by about 20% than the case of FIG. 9 of the invention). This difference further increases in a case where iron concentration in the feed water is less than the case of FIG. 10.

In a case where a pattern for controlling the concentration of iron contained in the feed water is previously determined, it is unnecessary to calculate the accumulation rate of iron accumurated on the fuel rod after measuring the iron concentration of the feed water, so that the control thereof can be effected in a simple manner while control in response to variation in output can not be effected.

As shown in FIG. 4, the iron concentration of the feed water is made to be in a high level during an initial period of the operating cycle of the plant while the iron concentration is made to be in a low level after the lapse of the initial period thereof, so that the fuel rod surface is covered by iron in an early stage in the initial period of the operating cycle to thereby adhere nickel and cobalt (both contained in the feed water) on the fuel rod while changing the nickel and cobalt into chemically stable states such as $NiFe_2O_4$ and $CoFeO_4$.

EMBODIMENT 3

Figure 3:
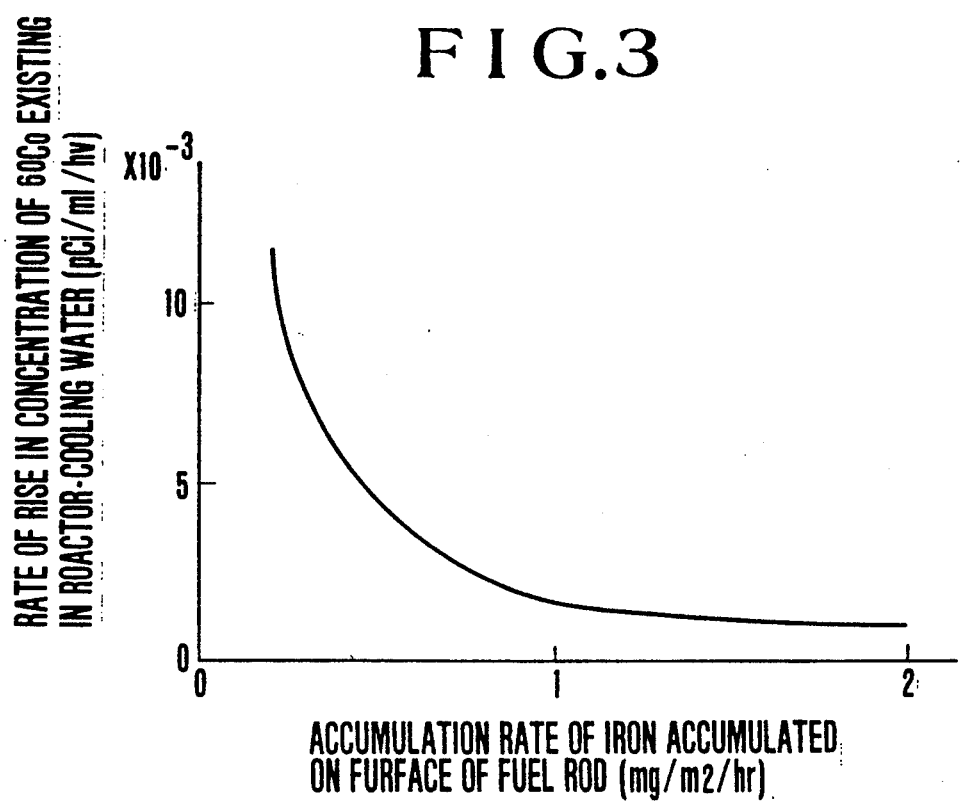
FIG. 3 is a graph showing a relation between $^{60}Co$ concentration increase rate in reactor water and iron accumulation rate on fuel rod surface.
Figure 5:
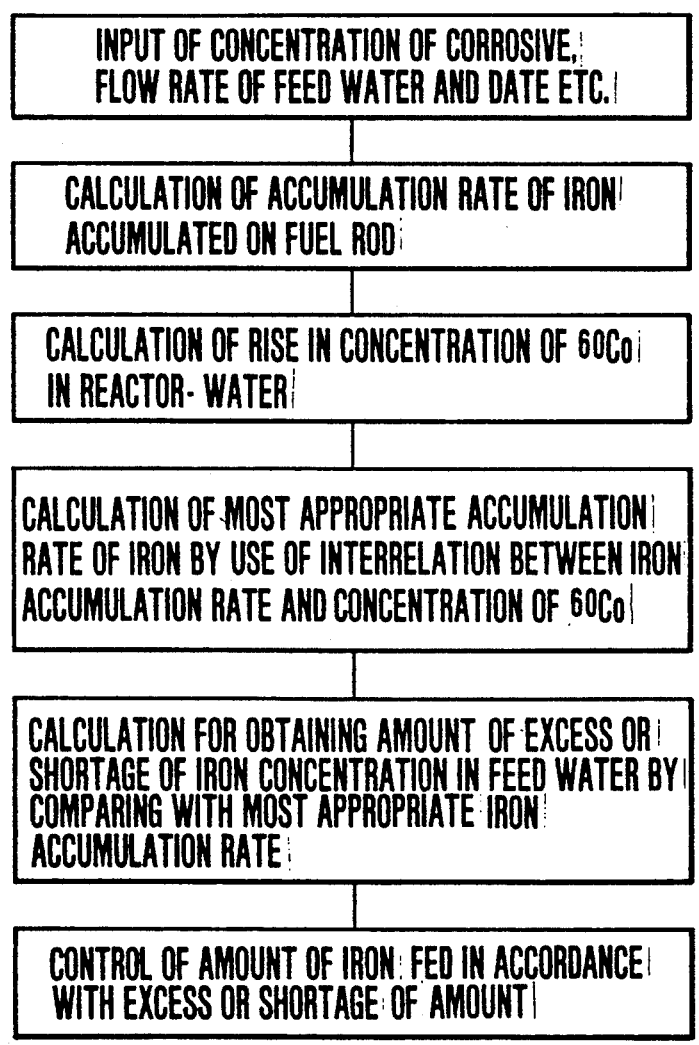
FIG. 5 is a flow chart for controlling iron concentration in feed water when iron accumulation rate is varied.

Although in the first and second embodiments, a rather rough estimation for $^{60}$Co concentration increase rate is used for controlling the iron concentration in feed water, the relation between iron accumulation rate on fuel rod and $^{60}$Co concentration increase rate in reactor water shown in FIG. 3 has actually a wide variation range. Therefore, in the third embodiment, control method of which is shown in FIG. 5, $^{60}$Co concentration in reactor water, feed water flow rate, operation date as well as iron concentration in feed water are input into the calculator and stored in the memory, and then iron accumulation rate on fuel rod and $^{60}$Co concentration increase rate in reactor water are calculated based on the above data. When the $^{60}$Co concentration increase rate is lower than a predetermined value, the newestly measured iron accumulation rate is registered as a new lower limit of the suitable iron accumulation rate. On the other hand, when the $^{60}$Co concentration increase rate is higher than the predetermined value, iron accumulation rate greater than the newestly measured iron concentration rate by 10-20% is registered as a new lower limit of the suitable iron accumulation rate. Thus, by varying the range of the optimum iron accumulation rate, the control of iron accumulation rate can be made the most optimum one for a peculiar plant and for a peculiar date. When the lower limit has been defined, other processes are identical to those in the first embodiment.

MODIFIED EMBODIMENT

Figure 6:
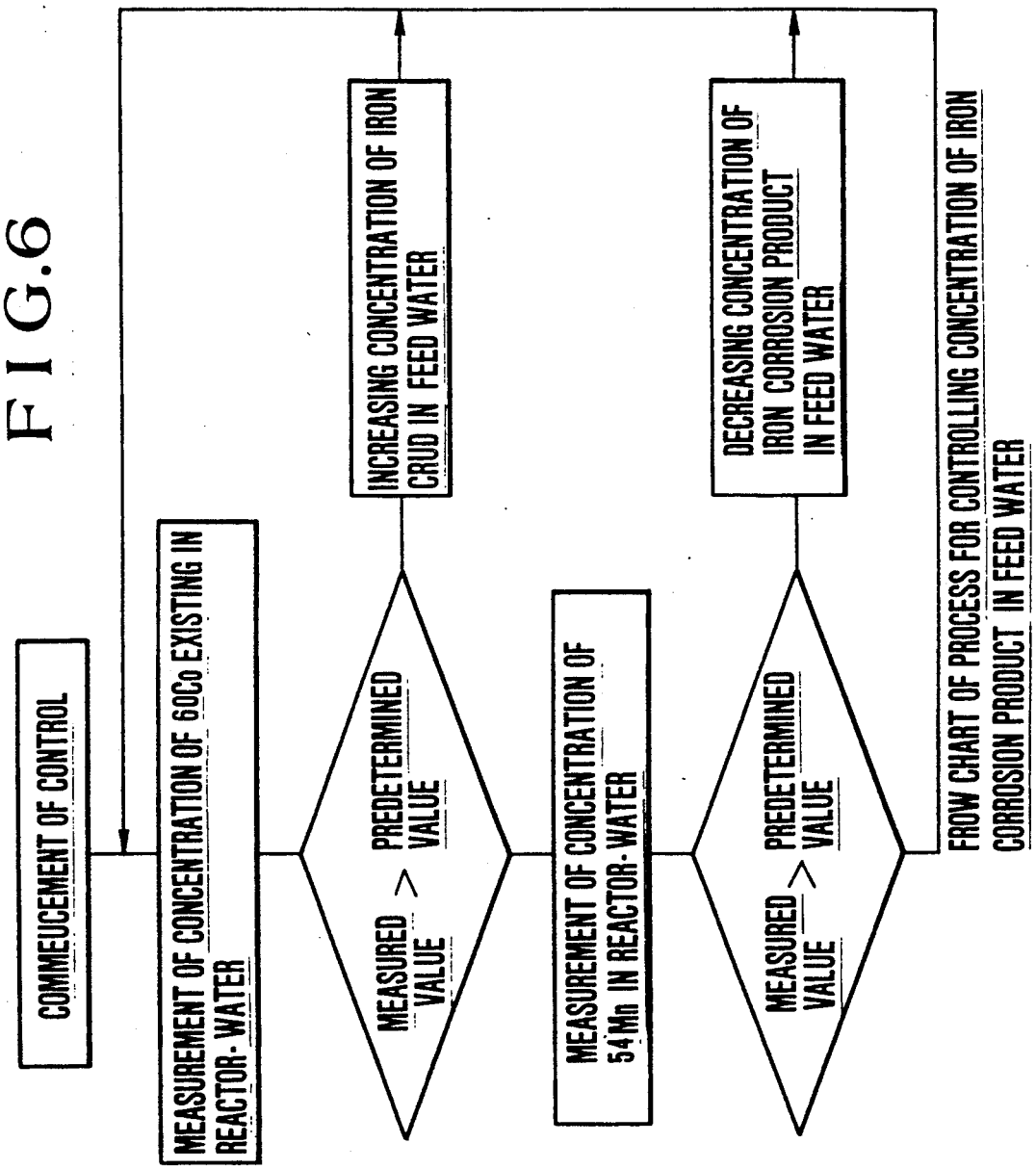
FIG. 6 is a flow chart for controlling iron concentration in feed water when $^{60}Co$ concentration and $^{54}Mn$ concentration in reactor water are selected as command indexes.

Here, $^{60}$Co concentration in reactor water and $^{54}$Mn concentration in reactor water are used as control indexes for controlling iron concentration in feed water. As shown in FIG. 6, when $^{60}$Co concentration in reactor water become higher, iron concentration in feed water is controlled at a higher level, while when $^{52}$Mn concentration in reactor water become higher, iron concentration in feed water is controlled at a lower level. In this case, since the radioactive corrosion products to be decreased are directly designated as control indexes, the control method is easy to understand, and can be carried out even if the detail of the reaction behavior is not clearly known. However, this method is not so optimum, because there is a considerable time delay regarding both the phenomenon of the activation and a time when numerical data showing the effective control by use of iron concentration is obtained.

EMBODIMENT 4

In a plant where nickel is so rich that Fe/Ni ratio is smaller than 2, nickel concentration measured in the feed water is required to be incorporated into control indexes for calculating iron accumulation rate, even if iron concentration rate is maintained to be not less than 0.5 (mg/m$^2$/hr). Nickel accumulation rate on fuel rod can be calculated through equation (1) by replacing iron concentration in the equation (1) by nickel concentration. Then, iron concentration in the feed water is controlled so that the ratio of iron accumulation rate to nickel accumulation rate become greater than 2. By virtue of this control method, nickel or cobalt adheres on fuel rod in a chemically stable state ($NiFe_2O_4$, $CoFe_2O_4$, etc.), thereby minimizing dissolution of radioactive cobalt. It should be noticed that the amount of nickel dissolved in the feed water from plant structures is not negligible for calculating nickel accumulation rate differently from iron case, and that only 60-70% of this nickel adheres to fuel rod surface, which value is small in comparison with iron case. For dealing with this matter in a simple manner, the nickel generation in reactor may be neglected by estimating the accumulation rate on fuel rod to be somewhat higher. This simplification causes little error. Further, in an operation suffering great output power variation such as in a starting test, the above-mentioned processes are not necessarily required, because, in a state of output power variation, corrosion products are liable to separate from fuel rod, and a sufficient control effect can not be expected. In the invention, Fe/Ni ratio is preferred to be in a range of 2-5.

EMBODIMENT 5

Figure 7:
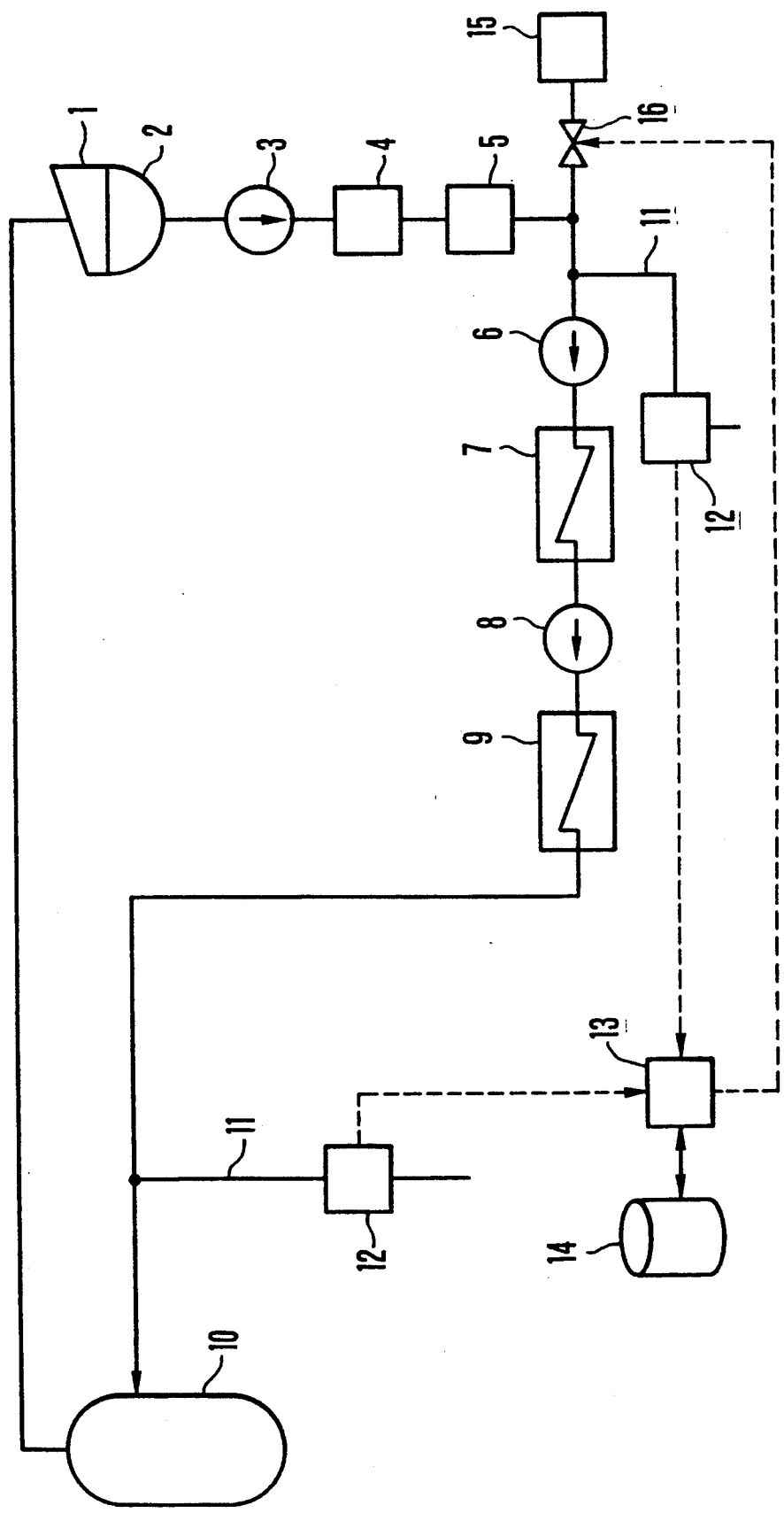
FIG. 7 is a system diagram of another embodiment of nuclear power plant of the invention in which embodiment there are disposed two iron concentration-measuring means at both the downstream and upstream sides of the feed water heater.

In the embodiment 1 the device for measuring the concentration of iron contained in the feed water was disposed between the high pressure feed-water heater and the pressure vessel of the nuclear reactor as shown in FIG. 1. In the embodiment 5, two devices for measuring the concentration of iron of the feed water were provided, the first device thereof being disposed with the same position as in the embodiment 1 and the second device was disposed at a position which was downstream side of the ion-injecting point and was at upstream side of the feed-water pump as shown in FIG. 7. By comparing two values measured through these upstream and downstream devices, it was possible to detect a loss of injected iron which loss occurred due to the adhesion of the iron to the feed-water heater and piping position between these two devices. In a case where this loss is varied in a large degree, it is deemed that a chemical stage of the injected iron is changed, with the result that it becomes possible to detect an abnormality of the iron ion-injecting device.

According to the present invention, $^{60}$Co concentration increase rate in reactor water can be maintained at a low level through whole period of operation substantially without increasing the concentration of radioactive corrosion product in reactor water which product adheres to plant structure such as piping. By virtue of the lowered $^{60}$Co concentration in reactor water, $^{60}$Co amount adhering to tubings of primary system of plant is decreased, thereby decreasing dose rate of the primary system which dose rate must be taken into consideration at the time of periodic inspections.

What is claimed is:

1. A water-cooled direct cycle nuclear power plant comprising a nuclear reactor, a turbine, a condenser, a condensed-water purifying means and a feed water heater successively arranged as main constitution, further comprising:
   means for measuring iron concentration in cooling water, and
   means for injecting iron into cooling water for controlling iron amount at an optimum level during operation of the nuclear power plant, said iron-injecting means having a processing unit which calculates a necessary amount of iron concentration based on the data obtained by said iron concentration measuring means in order to supply iron amount into said cooling water for making an iron accumulation rate on fuel rod be not less than 0.5 mg/m$^2$/hr, but not more than 2.0 mg/m$^2$/hr, during operation of the nuclear power plant and a control unit for controlling the iron amount in the cooling water.

2. A water-cooled direct cycle nuclear power plant claimed in claim 1, wherein said iron amount in the cooling water is controlled to make an iron accumulation rate be in a range of 1-2 mg/m$^2$/hr.

3. A water-cooled direct cycle nuclear power plant claimed in claim 2, wherein said means for injecting iron into cooling water is located downstream of the condensed-water purifying means.

4. A water-cooled direct cycle nuclear power plant claimed in claim 1, wherein said iron concentration in cooling water is measured at a point downstream of the condensed water-purifying means and upstream of the feed water heater, or at a point between the nuclear reactor pressure vessel and the feed water heater, or at both of said points.

5. A water-cooled direct cycle nuclear power plant claimed in claim 1, wherein the means for injection into the cooling water includes, an ionic iron-generating means for supplying at least one of iron components in the outlet of an means, having chemical states of iron ion, iron hydroxide, and iron oxide; and a pump for injecting the water containing said iron component, the pump acting to inject the water containing said iron component into cooling water of the nuclear power plant during operation of the plant.

6. A water-cooled direct cycle nuclear power plant claimed in claim 1, wherein the means for injection into the cooling water includes, a tank for storing water containing at least one of iron components having chemical states of iron ion, iron hydroxide, and iron oxide; and a pump for injecting the water containing said iron component, the pump acting to inject said water containing at least one of iron components into cooling water of the nuclear power plant during operation of the plant.

7. A method of operating a water-cooled direct cycle nuclear power plant including a nuclear reactor, a turbine, a condenser, a purifying means and a feed water heater successively arranged as main constitution, comprising the steps of: measuring iron concentration in cooling water; calculating iron amount to be added on the basis of said measured iron concentration for supplying an iron amount so as to make the iron accumulation rate on fuel rod to be not less than 0.5 mg/m$^2$/hr, but not more than 2.0 mg/m$^2$/hr; and injecting a suitable additional iron amount into the cooling water, said injecting being performed during operation of the plant.

8. A method of operating a water-cooled direct cycle nuclear power plant having a nuclear reactor, a turbine, a condenser, a purifying means and a feed water heater successively arranged as main constitution, comprising the steps of: measuring iron concentration in cooling water; calculating iron accumulation rate on fuel rod; measuring nickel concentration; calculating ration of iron concentration to nickel concentration in cooling water on the basis of said measured nickel concentration and said measured iron concentration; and injecting a suitable additional iron amount into the cooling water so as to make said concentration ratio to be greater than 2 when the measured concentration ratio is not more than 2 even in a case where the calculated iron accumulation rate is not less than 0.5 mg/m$^2$/hr, said injecting being performed during operation of the plant.

9. A water-cooled direct cycle nuclear power plant claimed in claim 1, wherein said means for injecting iron into cooling water injects the iron both during an initial operation period of the plant and thereafter.

10. A water-cooled direct cycle nuclear power plant claimed in claim 5, wherein the pump acts to inject the water containing said iron component both during an initial operation period of the plant and thereafter.

11. A water-cooled direct cycle nuclear power plant claimed in claim 6, wherein the pump acts to inject said water containing at least one of iron components both during an initial operation period of the plant and thereafter.

12. A method of operating a water-cooled direct cycle nuclear power plant claimed in claim 7, wherein said injecting is performed both during an initial operating period of the plant and thereafter.

13. A method of operating a water-cooled direct cycle nuclear power plant claimed in claim 8, wherein said injecting is performed both during an initial operating period of the plant and thereafter.

14. A method of operating a water-cooled direct cycle nuclear power plant claimed in claim 8, wherein said injecting is performed so as to make said concentration ratio greater than 2 and at most 10.

15. A method of operating a water-cooled direct cycle nuclear power plant claimed in claim 8, including the further step of calculating an iron amount to be added on the basis of said measured iron concentration, for supplying an iron amount so as to make the iron accumulation rate on the fuel rod to be not less than 0.5 mg/m$^2$/hr but not more than 2.0 mg/m$^2$/hr; and, in the injecting step, injecting a suitable additional iron amount into the cooling water even if said concentration ration is grater than 2, so as to achieve said concentration ratio to be greater than 2, and said iron accumulation rate to be not less than 0.5 mg/m$^2$/hr, but not more than 2.0 mg/m$^2$/hr, during operation of the plant.

16. A method of operating a water-cooled direct cycle nuclear power plant claimed in claim 7, wherein after 5000 hours of operation an iron amount to make the iron accumulation rate on the fuel rod not less than 0.5 mg/m$^2$/hr but not more than 1.0 mg/m$^2$/hr is calculated, and a suitable additional iron amount, based upon the calculated iron amount to make the iron accumulation rate not less than 0.5 mg/m$^2$/hr but not more than 1.0 mg/m$^2$/hr, is injected into the cooling water.

17. A method of operating a water-cooled direct cycle nuclear power plant claimed in claim 7, wherein the injecting is performed so as to make the iron concentration of the cooling water relatively large during an initial period of operation of the plant and relatively small thereafter.

18. A method of operating a water-cooled direct cycle nuclear power plant claimed in claim 8, wherein a suitable additional iron amount is injected into the cooling water so as to make said concentration ratio be greater than 2 but not more than 5.

* * * * *